US012557733B2

(12) United States Patent
Minnich et al.

(10) Patent No.: US 12,557,733 B2
(45) Date of Patent: Feb. 24, 2026

(54) SYSTEM FOR SUPPORTING AN UNLOAD TUBE OF AN AGRICULTURAL VEHICLE

(71) Applicant: CNH Industrial America LLC, New Holland, PA (US)

(72) Inventors: Michael Minnich, Elizabethtown, PA (US); Alexander Dunn, Prairie Village, KS (US); Karl Linde, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 653 days.

(21) Appl. No.: 18/081,280

(22) Filed: Dec. 14, 2022

(65) Prior Publication Data

US 2024/0196788 A1 Jun. 20, 2024

(51) Int. Cl.
| | |
|---|---|
| *A01D 41/12* | (2006.01) |
| *B60P 1/42* | (2006.01) |
| *B60P 3/22* | (2006.01) |
| *B65G 41/00* | (2006.01) |

(52) U.S. Cl.
CPC ............ *A01D 41/1217* (2013.01); *B60P 1/42* (2013.01); *B60P 3/2215* (2013.01); *B65G 41/002* (2013.01); *A01D 41/1208* (2013.01)

(58) Field of Classification Search
CPC ............ A01D 41/1217; A01D 41/1208; A01D 75/182; B60P 1/42; B60P 3/2215; B65G 41/002
See application file for complete search history.

(56) References Cited

U.S. PATENT DOCUMENTS

| | | | | |
|---|---|---|---|---|
| 1,374,728 A | * | 4/1921 | Geier | ................... B65G 41/002 |
| | | | | 198/315 |
| 2,585,414 A | | 2/1952 | Steffens | |

(Continued)

FOREIGN PATENT DOCUMENTS

| | | | | |
|---|---|---|---|---|
| BE | 735039 A | | 12/1969 | |
| DE | 2728162 A | * | 1/1978 | ............. A01D 41/12 |

(Continued)

OTHER PUBLICATIONS

The Extended European Search Report issued May 14, 2024, by the European Patent Office in corresponding European Patent Application No. 23 216 891.4. (9 pages).

*Primary Examiner* — Arpad Fabian-Kovacs
(74) *Attorney, Agent, or Firm* — Buchanan Ingersoll & Rooney PC

(57) ABSTRACT

A system for supporting an unload tube of an agricultural vehicle grain tank. The system includes a tension rod having an elongated body extending between (i) a first end that is configured to be either directly or indirectly connected to a frame of the agricultural vehicle and (ii) a second end having a first non-planar mounting surface. A support member includes (i) a first end that is configured to be either directly or indirectly connected to the unload tube and (ii) a second end that is configured to be directly connected to the second end of the tension rod. The second end of the support member has a second non-planar mounting surface that is configured to be directly engaged with the first non-planar mounting surface to limit relative motion between the tension rod and the unload tube in an assembled state of the system.

14 Claims, 6 Drawing Sheets

(56)                References Cited

U.S. PATENT DOCUMENTS

| 2,981,400 | A | * | 4/1961 | Rohweder | A01D 41/1217 |
| | | | | | 198/632 |
| 3,190,423 | A | | 6/1965 | Wenning | |
| 3,630,009 | A | * | 12/1971 | Ashton | A01D 45/02 |
| | | | | | 198/570 |
| 3,670,913 | A | * | 6/1972 | Reaves | A01F 12/46 |
| | | | | | 56/10.4 |
| 4,093,087 | A | * | 6/1978 | DeCoene | A01D 41/1217 |
| | | | | | 414/526 |
| 6,247,886 | B1 | | 6/2001 | Signer et al. | |
| 7,168,902 | B2 | * | 1/2007 | Terry | F16B 39/24 |
| | | | | | 411/149 |
| 7,195,557 | B2 | | 3/2007 | Hettiger | |
| 8,696,292 | B2 | | 4/2014 | Dulong | |
| 8,974,170 | B2 | * | 3/2015 | Ryder | B65G 41/002 |
| | | | | | 414/327 |
| 9,333,892 | B2 | * | 5/2016 | Johnson | B60P 1/42 |
| 9,815,398 | B2 | | 11/2017 | Duquesne et al. | |
| 10,137,817 | B1 | * | 11/2018 | Wheeler | A01C 15/003 |
| 12,295,287 | B2 | * | 5/2025 | Minnich | B60P 1/42 |
| 2007/0191080 | A1 | * | 8/2007 | Voss | A01D 41/1217 |
| | | | | | 460/114 |
| 2015/0156968 | A1 | | 6/2015 | Lauwers et al. | |
| 2016/0108943 | A1 | * | 4/2016 | Knutson | F16B 5/0225 |
| | | | | | 403/108 |
| 2017/0105342 | A1 | * | 4/2017 | McCully | A01D 41/1217 |
| 2018/0257536 | A1 | * | 9/2018 | Wood | B60P 1/36 |
| 2022/0340068 | A1 | * | 10/2022 | Wood | B60P 1/36 |

FOREIGN PATENT DOCUMENTS

| FR | | 2047902 | A1 | | 3/1971 | |
| WO | WO-2019165527 | A1 | * | 9/2019 | | A01D 61/00 |

* cited by examiner

SYSTEM FOR SUPPORTING AN UNLOAD TUBE OF AN AGRICULTURAL VEHICLE

FIELD OF THE INVENTION

The present invention relates to agricultural vehicles, such as combine harvesters. More specifically, the present invention relates to an apparatus for reinforcing the grain tank and unload tube of an agricultural vehicle.

BACKGROUND OF THE INVENTION

As is described in U.S. Patent App. Pub. No. 2015/0156968 to CNH America LLC (the '968 Pub.), which is incorporated by reference in its entirety and for all purposes, a combine harvester is a type of agricultural vehicle that is used to harvest grain crops.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the material other than grain ("MOG") through the action of the drum against the concaves that may also be fitted with steel bars and a meshed grill, through which grain, chaff and smaller debris may fall, whereas the straw, being too big or long, is carried through to the outlet. The chaff, straw, and other undesired material (i.e., MOG) are returned to the field via a spreader mechanism.

The threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located in an upper portion of the combine and loaded via a conveyer that carries clean grain collected in the cleaning system to the grain tank.

Conventional unload systems include grain tanks arranged such that grain conveyed from the cleaning system fills the tanks and is gravity-fed into one or more cross augers. By virtue of gravity feed and the cross augers, grain may be distributed to one or more areas in the grain tank, such that another conveying system can unload the grain from the grain tank. Because the typical grain tank is small compared to the size of the harvest, grain that collects temporarily in the grain tank may, in some harvests, be conveyed or unloaded via an unload tube to a support trailer, truck, or grain cart alongside the combine.

The unload tube, which has considerable length and weight, is pivotably mounted to the grain tank. Described herein is a system for reinforcing the unload tube, grain tank and/or the vehicle in an effort to support the considerable weight of the unload tube.

SUMMARY OF THE INVENTION

According to one aspect of the invention, a system for supporting an unload tube of an agricultural vehicle grain tank id provided. The system includes a tension rod having an elongated body extending between (i) a first end that is configured to be either directly or indirectly connected to a frame of the agricultural vehicle and (ii) a second end having a first non-planar mounting surface. A support member includes (i) a first end that is configured to be either directly or indirectly connected to the unload tube and (ii) a second end that is configured to be directly connected to the second end of the tension rod. The second end of the support member has a second non-planar mounting surface that is configured to be directly engaged with the first non-planar mounting surface to limit relative motion between the tension rod and the unload tube in an assembled state of the system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Figure 1:
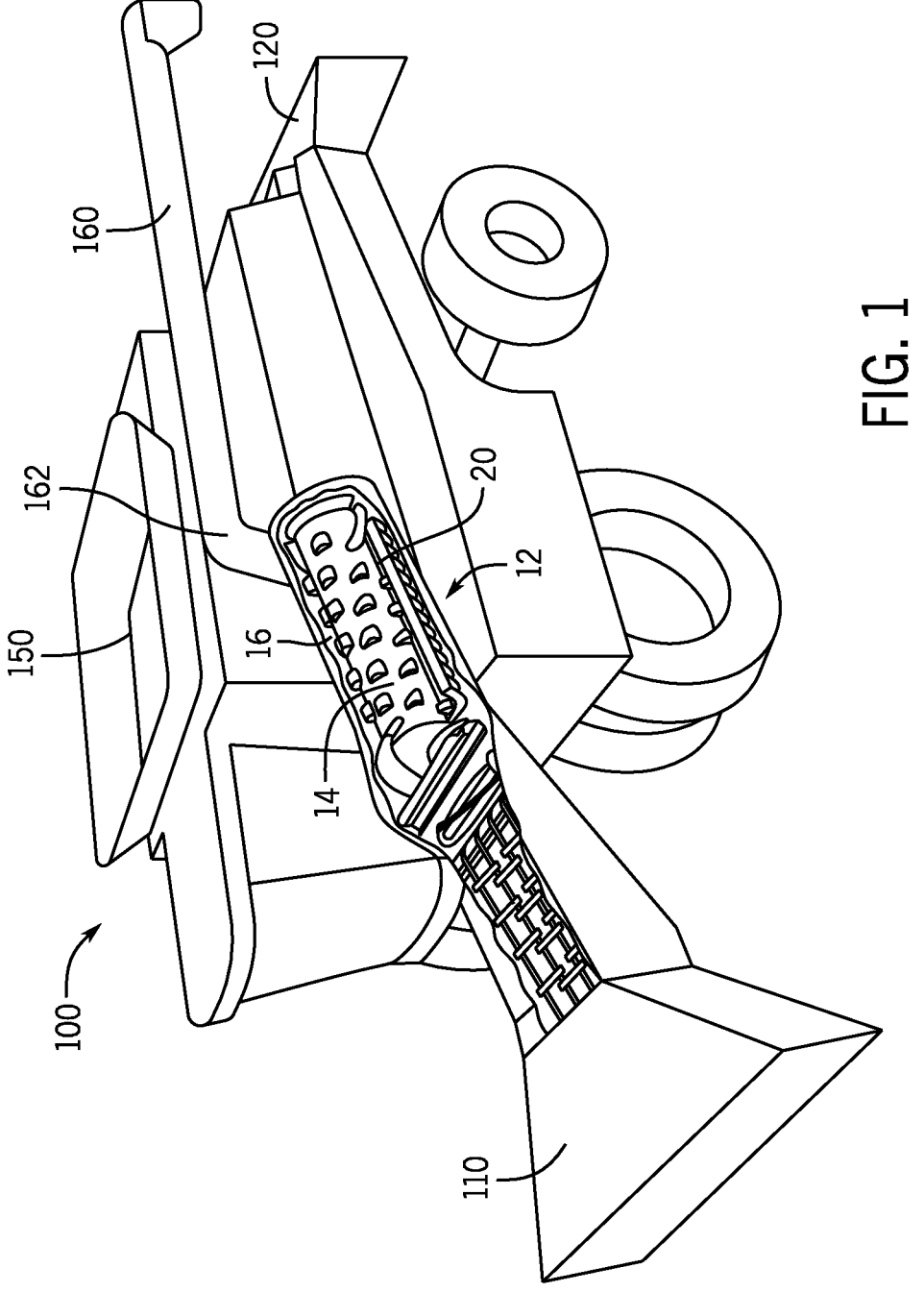
FIG. 1 illustrates a perspective view of an exemplary combine for use with embodiments described herein.

It is noted that the figures depict the elements in schematic form and are not necessarily to scale.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

3

Figure 2:
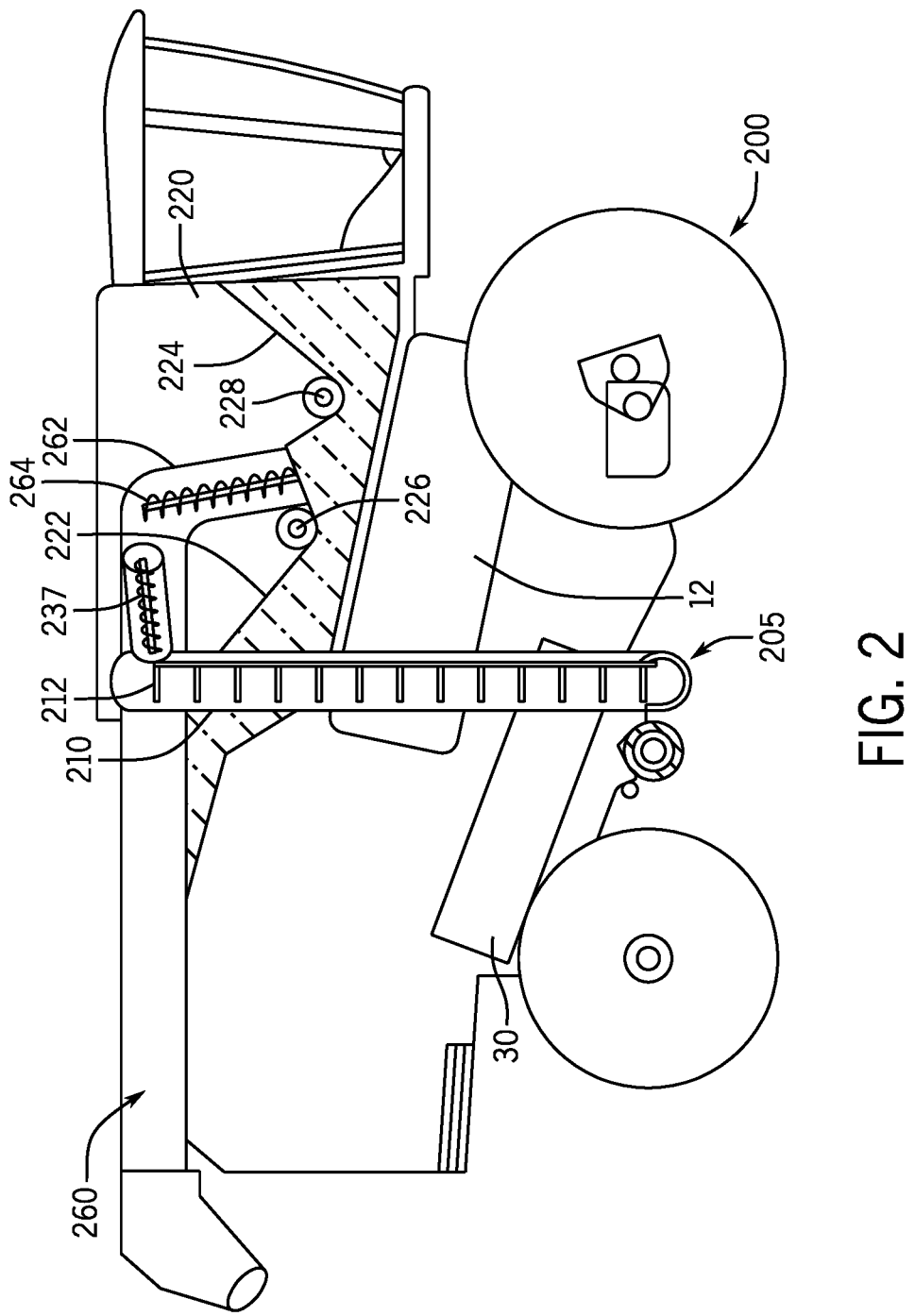
FIG. 2 illustrates a side view of another exemplary combine for use with embodiments described herein.

As is described in the '968 Pub., FIGS. 1 and 2 show exemplary agricultural combines in which exemplary embodiments described herein may be implemented. FIG. 1 shows an exemplary agricultural combine 100, which may also be referred as a combine or harvester throughout this specification. As shown in FIG. 1, the combine 100 can include header 110, a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concave 20 may extend circumferentially around the rotor 14 and the flow of crop may pass in the space between the spinning rotor and the concaves. As the crop material flows through the threshing and separation system 12, the crop material will be loosened and separated from crop residue or MOG, and the separated materials may be carried away from the threshing and separation system 12 in a well-known conventional manner. Crop residue can be redistributed to the field via a spreader 120, located at, for example, the back of the harvester.

The remaining threshed crop, which includes the grain to be collected, is then cleaned via a cleaning system. The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160. Unload tube 160 represents a turret style system of offloading. Vertical tube 162 may include a single unload conveying auger or multiple unload conveying augers, such as an auger for propelling grain up and to another horizontal auger that is located within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown.

FIG. 2 shows a transparent cross-sectional view of an exemplary agricultural combine 200. Many of the details in connection with combine 100 apply to combine 200, and only the differences therebetween are described below.

Combine 200 includes a grain tank 220 with multiple cross augers 226 and 228. Crop is threshed via threshing system 12. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210 which includes a paddle chain lift 212. The paddle chain lift 212 conveys the grain upward to a dispenser auger 237 that discharges the grain into the grain tank 220. In this arrangement of grain tank 220, sloping side walls 222 and 224 are sloped such that as grain accumulates in the 20) grain tank 220 as conveyed from dispenser auger 237, the grain naturally slides down to cross augers 226 and 228. Grain tank cross augers 226 and 228 convey the accumulated grain laterally so that it may be collected into vertical tube 262 which includes an unload conveying vertical auger 264 that propels the grain upward. This allows grain to be moved into an unload vehicle via unload tube 260, which includes another unload conveying internal auger (not shown) that rotates about a pivot coextensive with vertical tube 262.

As noted above, the unload tubes 160 and 260, which are mounted either directly or indirectly to the grain tanks 150 and 220, respectively, have considerable length and weight and are pivotably mounted to the grain tank. Each unload tube pivots between a transport position (adjacent the grain tank) and an unload position in which the unload tube is pivoted away from the grain tank to transfer clean grain to a support trailer, truck, or grain cart that is positioned alongside the combine. Unload tube systems may be subject to unload tube sag due to various reasons such as bushing wear, clamp joint slip, and system component deflection.

Described hereinafter is a system for reinforcing the unload tube, grain tank and/or the vehicle in an effort to support the considerable weight of the pivoting unload tube.

Figure 3:
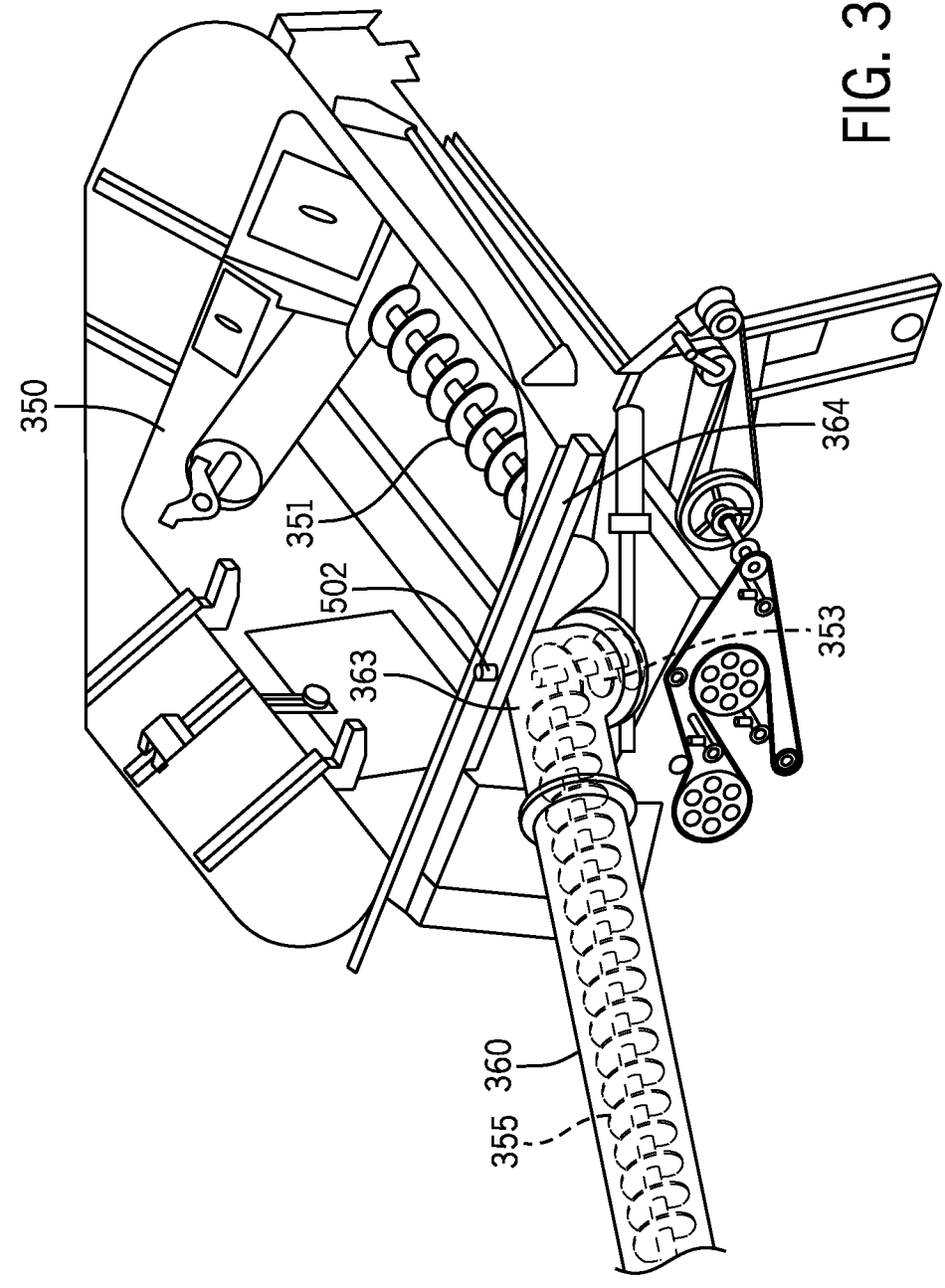
FIG. 3 is an isometric view, as viewed from the top, of a grain tank assembly of yet another combine and for use with embodiments described herein.
Figure 4:
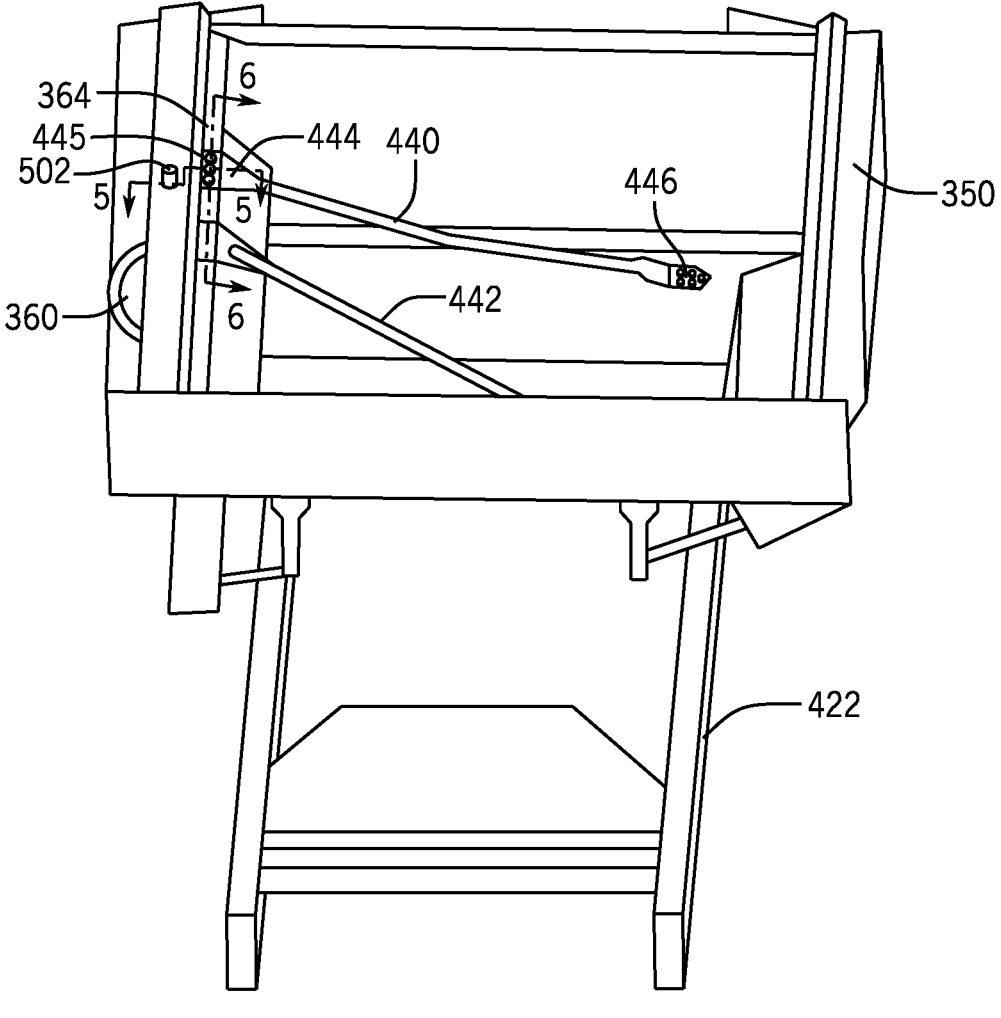
FIG. 4 is another isometric view of the grain tank assembly of FIG. 3 mounted to a vehicle frame.

FIGS. 3 and 4 depict an isometric view of a sub-assembly of yet another combine. The above described details of combines 100 and 200 apply to the combine of FIGS. 3 and 4, unless otherwise noted.

The combine of FIGS. 3 and 4 generally includes a grain tank 350, which is mounted to a structural frame 422 of the combine. A cross-auger 351 is mounted at the bottom of tank 350 for supplying grain to unload tube 360. Unload tube 360 includes a vertical unload auger 353 for receiving grain from cross-auger 351 and delivering the grain to a swing auger 355. Both augers 353 and 355 are positioned within the hollow interior of tube 360. The swing auger 355 rotates around an axis of the vertical auger 353 between a transport and an unload position. Unload tube 360 includes a ninety-degree tubular elbow casting 363 that houses at least a portion of the augers 353 and 355. A pivot pin 502 is disposed at the top of elbow 363. Pin 502 passes through frame member 364 of grain tank 350. Tube 360 may be rotatably suspended from frame member 364 by pin 502. The pin 502 is held in position on frame member 364 by a bushing that is located within a casting.

Two tension rods 440 and 442 (shown in FIG. 4, but not FIG. 3) are provided for reinforcing and enhancing the structural integrity of tank 350 and unload tube 360. Rod 440 is referred to herein as a front tension rod because it extends toward the front of the vehicle, whereas rod 442 may be referred to herein as a rear tension rod because it extends toward the rear of the vehicle. The reinforcement purpose of rod 440 will be described hereinafter, however, it should be understood that rod 442 may include a similar reinforcement system.

Rod 440 has an elongated body that extends between two connection ends 444 and 446. End 444 is mounted to frame member 364 of grain tank 350 by three fasteners 445 (for example). Fasteners 445 may be bolts, for example. End 444 is indirectly mounted to unload tube 360 (via a support member 560 of FIG. 5) such that the end 444 supports at least a portion of the weight of unload tube 360.

Rod end 446 of rod 440 may be mounted to a wall of tank 350 that forms an auger trough. End 446 is also mounted to frame 422 by a fastening system including bolts and serrated washers that together work to prevent inadvertent movement (i.e., slip) of those bolts.

Figures 5, 5A:
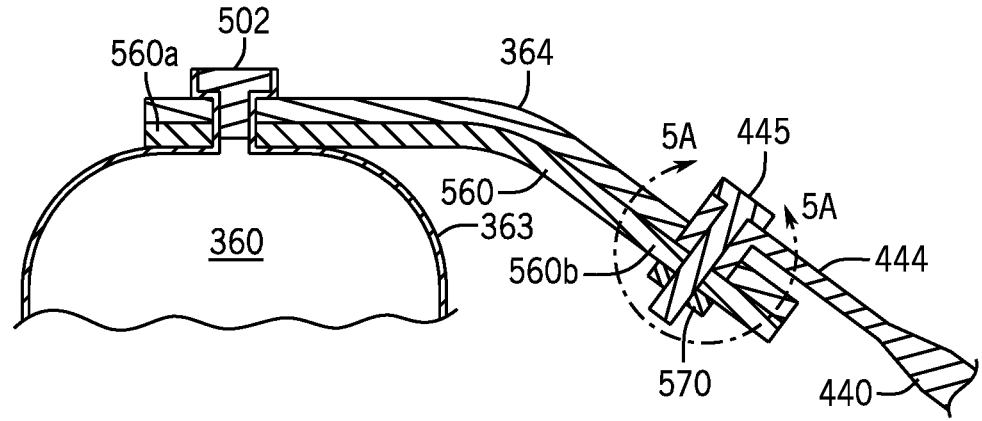
FIG. 5 is a cross-sectional view of FIG. 4 taken along the lines 5-5 showing the interconnection between one of the tension rods and the unload tube of the grain tank assembly.
FIG. 5A is a detailed view of FIG. 5.
Figure 6:
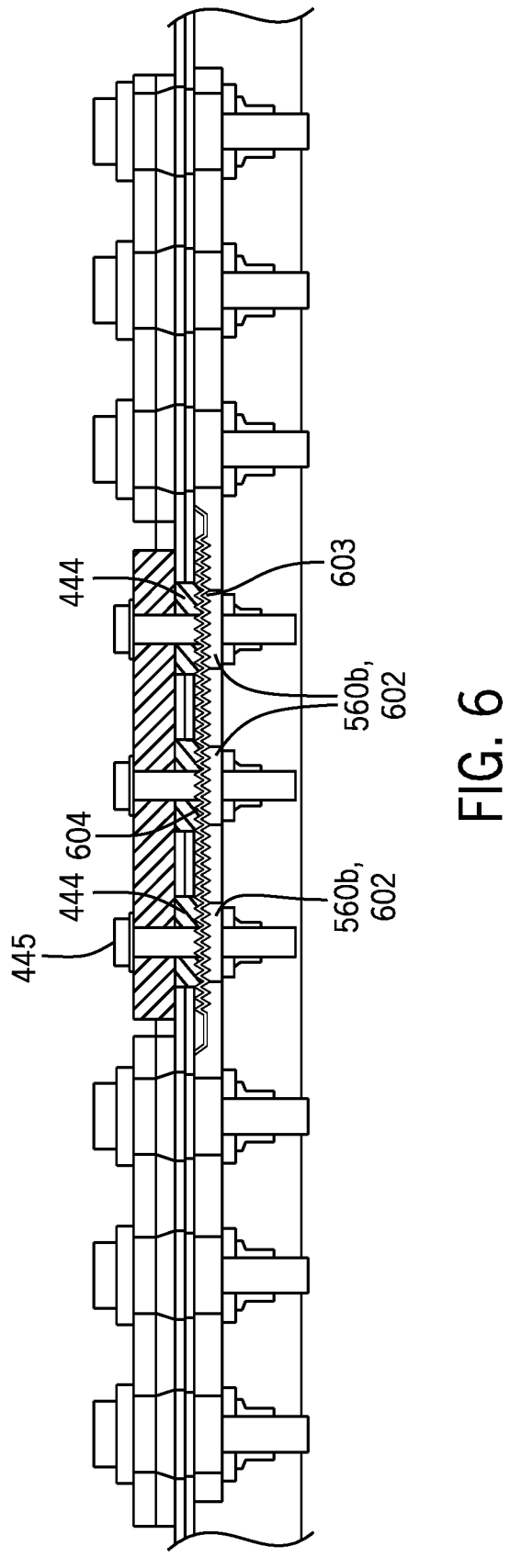
FIG. 6 is a cross-sectional view of FIG. 4 taken along lines 6-6.

Turning now to FIGS. 5-6, a support member 560 is fixedly connected to the frame member 364 by one or more fasteners. The first end 560*a* of support member 560 is connected to pin 502 and supports at least a portion of the weight of tube 360. The second end 560*b* of support member 560 is connected to rod end 444 by a plurality of the fasteners 445 and nuts 570.

As best shown in FIGS. 5A and 6, a support member 560 and rod 440 together support the weight of unload tube 360 and transfer at least a portion of that weight onto the frame 422 of the combine. Support member 560 includes a first end 560*a* that is mounted to pivot pin 502 that is fixed to the top side of unload tube 360. It should be understood that end 560*a* may be connected to unload tube 360 at a different location. The second end 560*b* of support member 560 is connected to rod 440.

More particularly, rod end 444 is positioned through a passage formed in frame member 364 such that rod end 444 can engage with second end 560*b* of support member 560. Second end 560*b* of support member 560 includes three tines 602 each having upwardly facing serrations 603 that mate with downwardly facing serrations 604 formed on rod end 444.

The serrations 603 and 604 mate with each other in order to either limit or prevent inadvertent movement of rod end 444 and support member 560. Engagement between the serrations 603 and 604 also significantly limits shifting and movement between the tube 360 relative to tank 350 in an assembled state of combine.

The serrations 603 and 604 provide joint retention in the direction of the unload auger in its transport position shown in FIG. 1. This direction may be the longitudinal direction of the vehicle. The serrations 603 and 604 also allow for adjustment in the longitudinal direction with positive interlock to prevent joint slip. In other words, prior to fastening the fasteners 445, the serrations 604 on rod end 444 can be selectively positioned on the serrations 603 of support member 560 at a particular position that prevents joint slip. Once that position has been selected, fasteners 445 are tightened. The tension rod 440 also resists loading in the direction of the unloading tube via the end 444 that protrudes through the top beam 364.

The serrations may have a V-shape (for example) or a saw-tooth right-triangle shape as viewed in cross-section. The serrated surfaces may be generally referred to herein as non-planar mounting surfaces. The serrated surfaces may also be described as undulating, uneven or non-planar. The serrations can vary, and be provided in the form of projections, pins, pegs, or undulations. The ends of the serrations may be either sharp and pointed, or rounded. Although not as effective, the serrations could be replaced by a friction surface (e.g., a high friction surface coating, rough machining process, and so forth) without departing from the scope or spirit of the invention.

The above described components of the fastening system may be composed of a metallic material, for example, or any other material known to those skilled in the art.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle grain tank assembly, the agricultural vehicle grain tank assembly comprising:
   a grain tank:
   an unload tube moveably mounted to the grain tank between a deployed position and a stowed position:
   a tension rod having an elongated body extending between a first end that is connected to the grain tank and a second end arranged opposite the first end and having a first non-planar mounting surface; and
   a support member including a first end that is connected to the unload tube and a second end that is directly connected to the second end of the tension rod, the second end of the support member being arranged opposite the first end of the support member and having a second non-planar mounting surface that is directly engaged with the first non-planar mounting surface to prevent relative motion between the tension rod and the unload tube in an assembled state of the system,
   wherein the tension rod and the support member are fixed to each other and the grain tank such that the unload tube moves between the deployed position and the stowed position relative to the tension rod and the support member.

2. The agricultural vehicle arain tank assembly of claim 1, wherein the first and second non-planar mounting surfaces each comprise complimentary serrations, undulations, projections or teeth.

3. The agricultural vehicle grain tank assembly of claim 1, wherein the first and second non-planar mounting surfaces each comprise complimentary serrations.

4. The agricultural vehicle grain tank assembly of claim 1, further comprising a wall of the grain tank that interconnects the unload tube and the tension rod.

5. The agricultural vehicle grain tank assembly of claim 4, wherein the unload tube is mounted to the wall of the grain tank by a pivot pin, and the first end of the support member is mounted to the pivot pin.

6. The agricultural vehicle grain tank assembly of claim 4, wherein the support member is connected to the wall of the grain tank by fasteners.

7. The agricultural vehicle grain tank assembly of claim 4, wherein the wall of the grain tank includes an opening through which the second end of the tension rod passes.

8. The agricultural vehicle grain tank assembly of claim 1, further comprising openings disposed through the first and second non-planar mounting surfaces for receiving fasteners that connect the tension rod to the support member.

9. The agricultural vehicle grain tank assembly of claim 1, wherein the first end of the tension rod is connected either at or near a bottom end of the grain tank, and the second end of the tension rod is connected either at or near a top end of the grain tank.

10. The agricultural vehicle grain tank assembly of claim 1, wherein the first non-planar mounting surface is integrally formed on the tension rod.

11. An agricultural vehicle comprising the agricultural vehicle grain tank assembly of claim 1.

12. The agricultural vehicle of claim 11, wherein the first and second non-planar mounting surfaces each comprise complimentary serrations, and wherein the serrations each extend perpendicularly to a longitudinal axis of the unload tube while the unload tube is positioned in the stowed position to prevent movement of the tension rod along the longitudinal axis.

13. The agricultural vehicle grain tank assembly of claim 1, wherein the tension rod is positioned at least partially within an interior region of the grain tank.

14. A combine harvester comprising the agricultural vehicle arain tank assembly of claim 1.

* * * * *